United States Patent Office 3,429,147
Patented Feb. 25, 1969

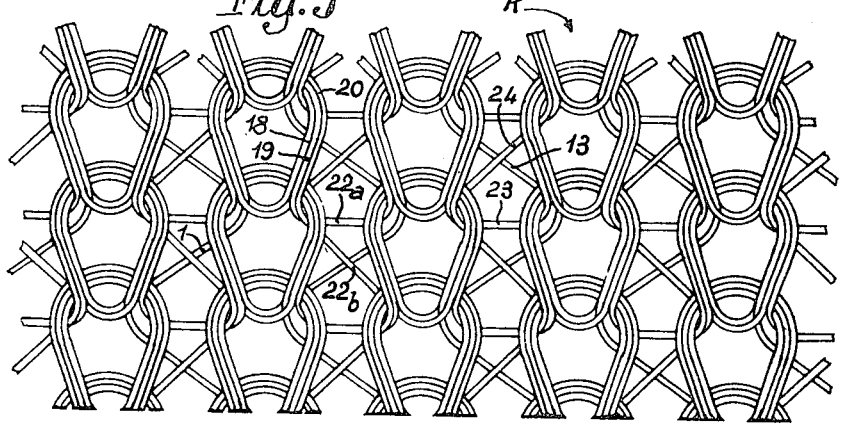
Fig. 5
Fig. 6
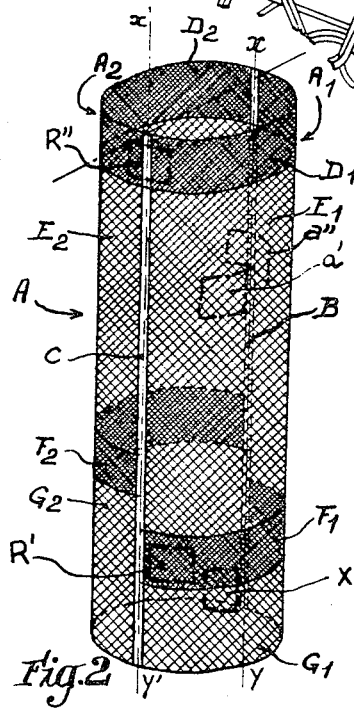
Fig. 2

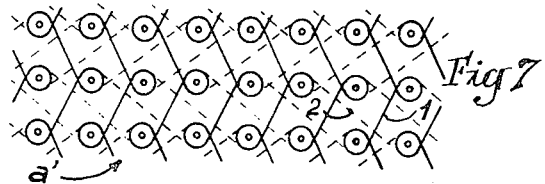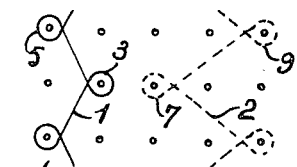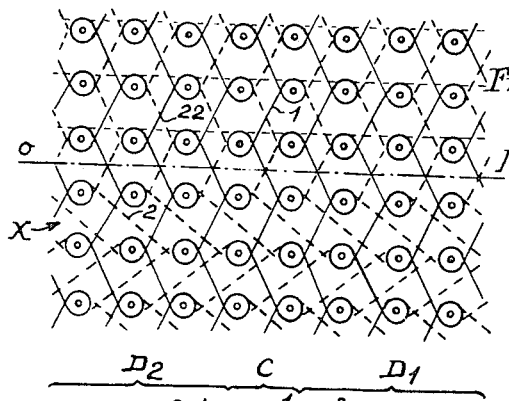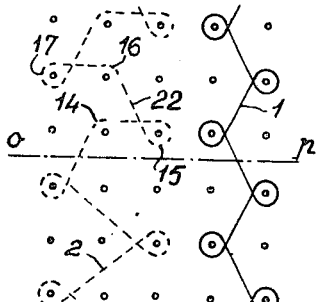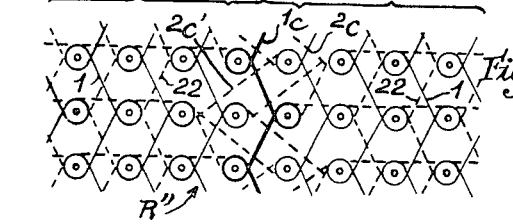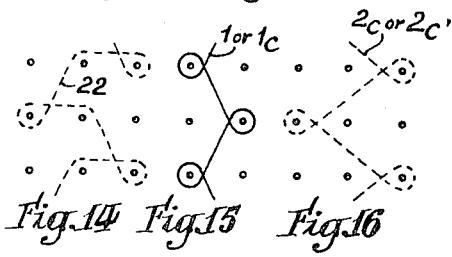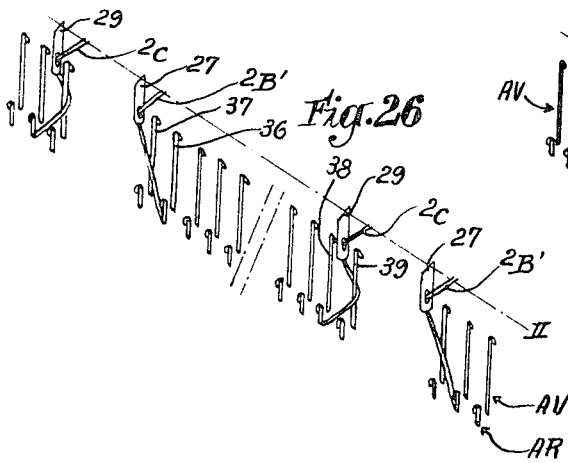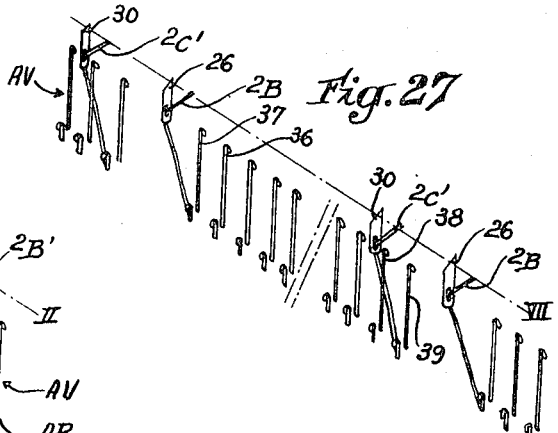

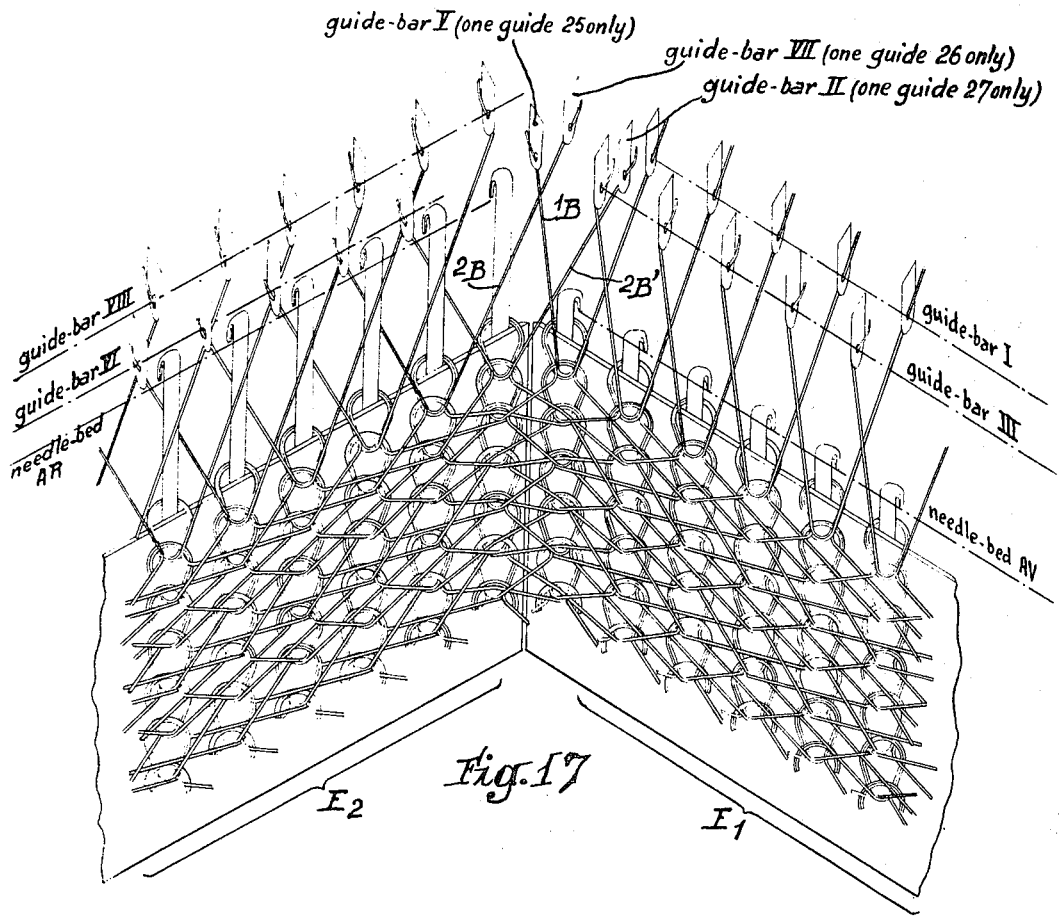

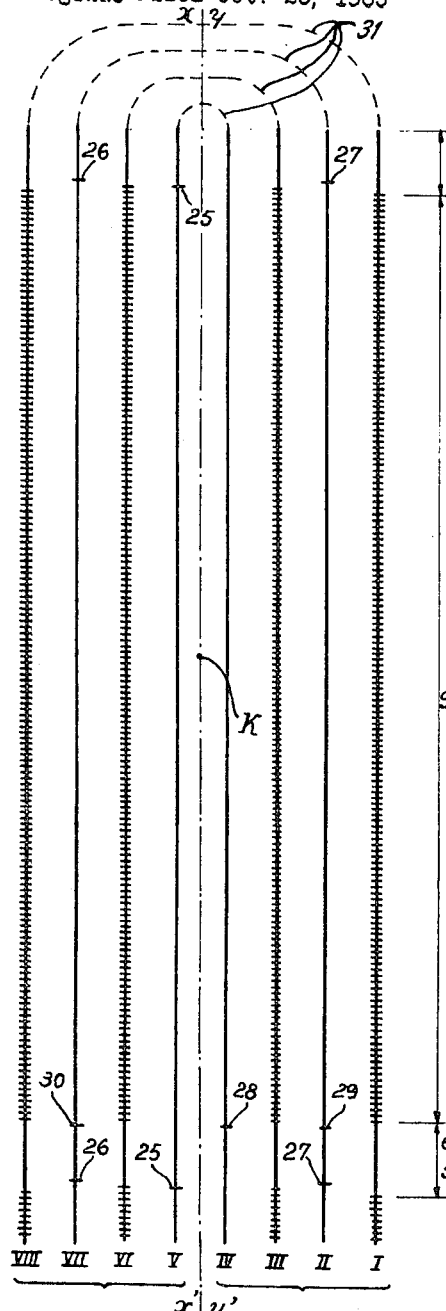
Fig. 18
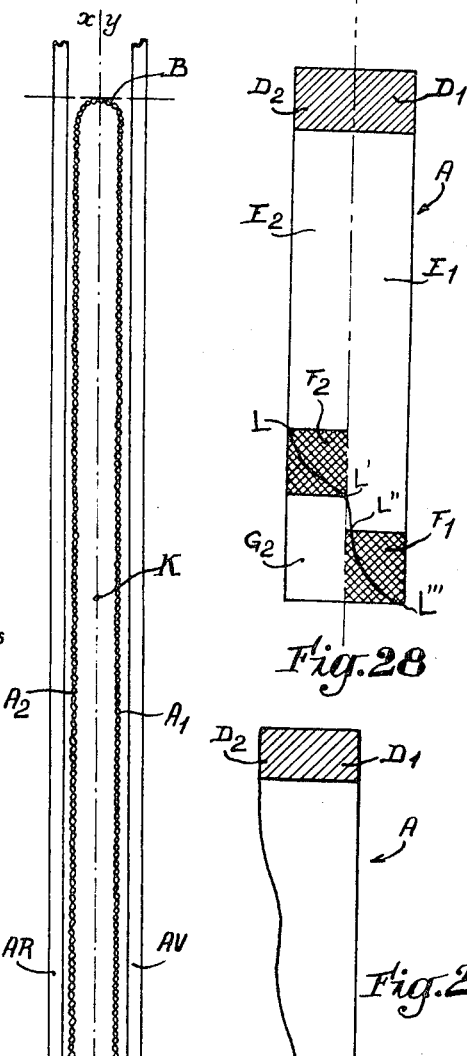
Fig. 19
Fig. 28
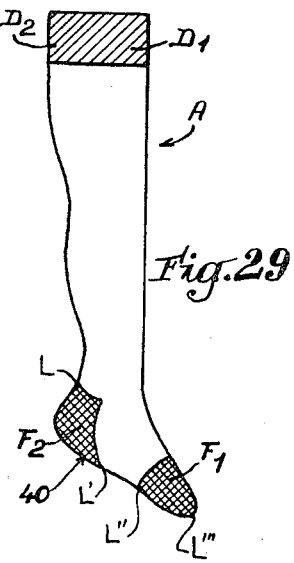
Fig. 29

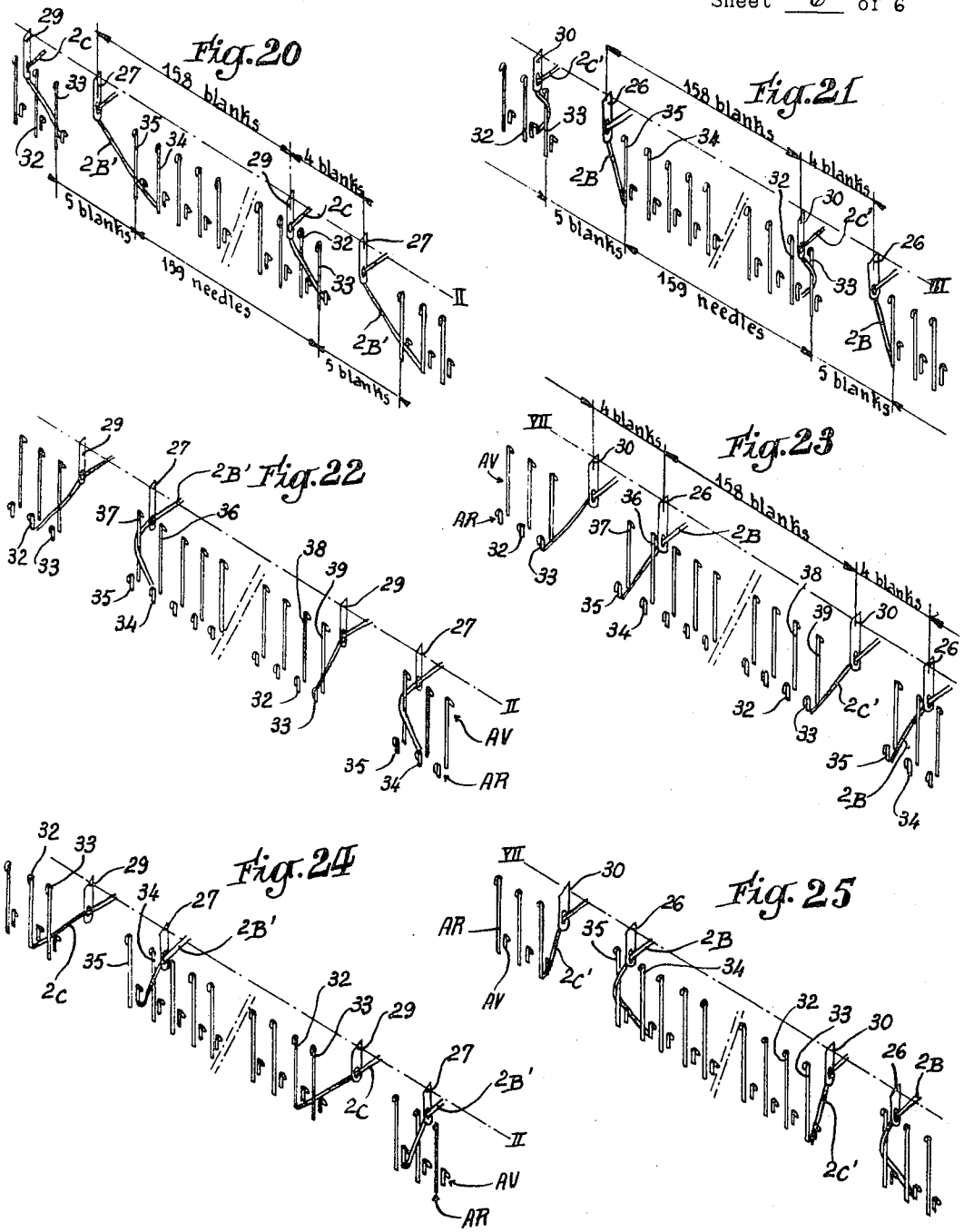

3,429,147
TUBULAR SEAMLESS WARP-KNITTED STOCKING
Marius Antoine Perrier, Lyon, France, assignor to J. B. Martin-Velours Peluches, Soieries-S.A., Geneva, Switzerland, a Swiss company
Continuation of application Ser. No. 505,182, Oct. 25, 1965. This application Mar. 29, 1968, Ser. No. 717,462
Claims priority, application France, Feb. 8, 1962, 42,272
U.S. Cl. 66—195                    7 Claims
Int. Cl. D04b 21/00, 11/28, 9/46

ABSTRACT OF THE DISCLOSURE

The warp-knitted seamless stocking has unreinforced leg sections such as the welt, heel and toe, formed by the same fixed number of sets of yarns. The selected reinforced fabric sections are achieved by a change in the stitch construction in said selected sections without the use of or introduction of any additional yarn or sets of yarns into the fabric structure.

---

This application is a continuation of application Ser. No. 505,182, filed on Oct. 25, 1965, now abandoned, which was a continuation-in-part of application Ser. No. 250,347, filed Jan. 31, 1963, now abandoned. The present invention relates generally to warp-knit fabrics and more particularly to seamless stocking and to a new method of making same.

One object of the invention is to produce a seamless stocking on a multi-needle bank warp-knitting machine provided with a double row of needles.

Another object of the invention is to obtain on such multi-needle bank warp-knitting machine a non-run seamless stocking.

A more specific object of the invention is to knit at the same time on the same knitting machine, a plurality of tubular seamless stockings which may be simultaneously and independently knitted according to different dimensions. It will be understood that such a characteristic greatly improves the flexibility of use of the knitting machines in a manufacture.

Still another object of the invention is to provide a non-run and non-catch seamless stocking.

A still further object of the invention is to eliminate the usual drawbacks of the seamless stockings of known type, which tend to twist about the leg and on the ankle because of the necessarily helical disposition of the rows of loops on circular knitting machines.

Finally, another object of the invention is to reduce to a minimum the weight of the clippings obtained by cutting the fabric in order to finish the stocking by sewing or overstitching the fabric only along a line located under the foot section. It is apparent that such a very simple making obliges to knit reinforced portions extending only on one half of the tubular fabric, which is impossible with any circular knitting machine.

These objects are accomplished in a preferred embodiment of the invention by using a multi-needle bank warp-knitting machine with two parallel rows of needles allowing the simultaneous production of two flat strips of fabric joined together along their vertical edges by means of connecting threads alternately knitted on each row of needles, said flat strips of fabric having patterns varying independently according as the stocking portion being knitted corresponds to the thigh, to the leg, or to the foot section.

It is apparent that, when both patterns define a reinforced design, the resulting stocking portion is reinforced on its whole periphery, for example at the garter attaching section provided at the top of the stocking. Along the leg section, both patterns are also identical, but they define an unreinforced design referred to base fabric. At the beginning of the foot section, the flat strip of fabric corresponding to the foot step is made of base fabric and the pattern of the heel flat strip of fabric corresponds to a reinforced design. Finally, the needle bed producing the stocking toe portion will knit a reinforced flat strip of fabric, while the other needle bed knits base fabric, since the corresponding portion of fabric is to be eliminated as a clipping after cutting.

As a result thereof, the knitting machine may be adapted to produce at the same time several independent tubular fabrics of similar or different sizes, set up one next to the other.

In the drawings:

FIG. 2 shows a tubular fabric according to the invention.

FIG. 5 shows on an enlarged scale the loop formation of a reinforced section (area R', FIG. 2).

FIG. 6 illustrates on an enlarged scale the loop formation of the junction connecting the vertical edges, of both flat strips of fabric in the area a" (FIG. 2).

FIG. 7 is a conventional representation corresponding to FIG. 3 and indicating the combined motion of guide bars I and III for the front needle bed, or of guide bars VI and VIII for the rear needle bed.

FIG. 8 indicates the motion of the guide bars III and VI in the making of said fabric construction.

FIG. 9 indicates the motion of the guide bars I and VIII in the making of said fabric construction.

Figure 4:
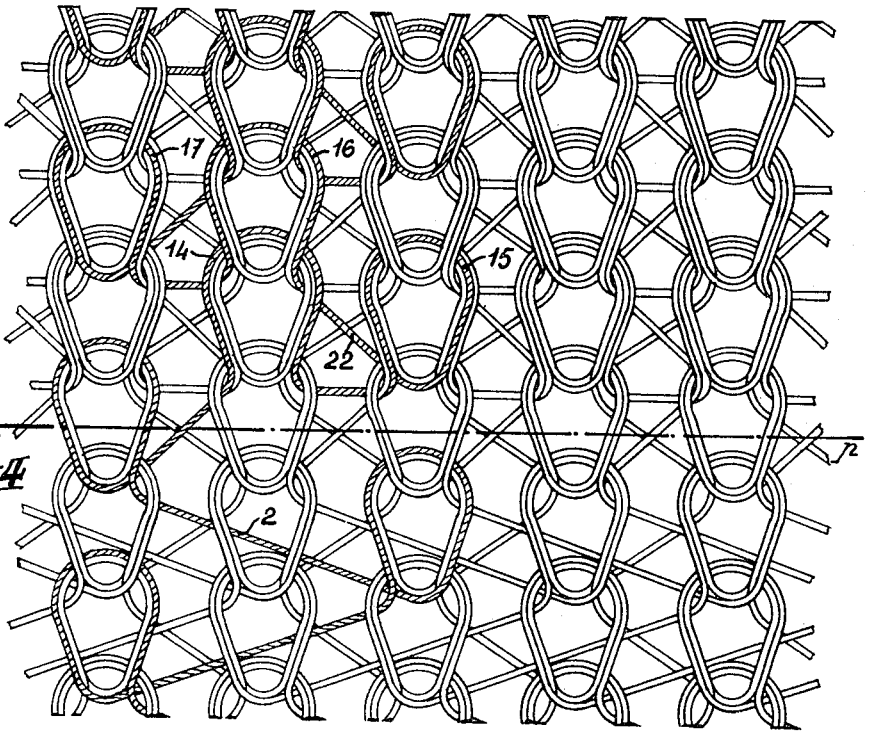
FIG. 4 illustrates the loop formation of the horizontal junction between two sections having different patterns on the same flat strip of fabric, namely a reinforced section above and a base fabric below (area X, FIG. 2).

FIG. 10 is a conventional representation corresponding to FIG. 4 and indicating the combined motion of the guide-bars I and III for the front needle bed, or of the guide bars VI and VIII for the rear needle bed.

FIG. 11 indicates the motion of the guide bar I or VIII in the making of said fabric construction.

FIG. 12 is a similar diagram for guide bar III or VI.

FIG. 13 is a conventional representation corresponding to area R" (FIG. 2) and indicating the combined motion of the guide bars I, II, III, IV, VI, VII and VIII.

FIG. 14 indicates the motion of the guide bars I and VIII in the making of said fabric construction.

FIG. 15 indicates the corresponding motion of the guide bars III, VI and IV.

FIG. 16 indicates the corresponding motion of the guide bars II and VII.

FIG. 17 is a partial exploded perspective of the knitting machine, showing the two needle-beds, the two flat strips of fabric together with one of their transverse interknitted joints, and the position of the guide bars.

FIG. 18 is a diagrammatical top plan view showing how each of the eight guide bars are threaded.

FIG. 19 is a top plan view on the same scale, showing the flat strips and transverse interknitted joints of the tubular fabric between both needle beds.

FIGS. 20, 22, 24 and 26 illustrate four successive positions of guide-bar II, corresponding to four successive rows of loops.

FIGS. 21, 23, 25 and 27 illustrate the corresponding four successive positions of guide-bar VII at the same time.

FIG. 28 shows the tubular fabric of FIG. 2, laid flat before cutting and sewing under the foot section.

FIG. 29 shows the stocking after heat-setting.

The seamless stocking shown in FIGS. 28 and 29 is made of the tubular fabric A illustrated in FIG. 2. Said tubular fabric is knitted on a multi-needle bank warp-knitting machine of the kind shown in FIGS. 1, 17, 18 and 19.

Figure 1:
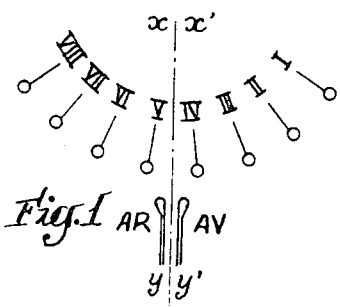
FIG. 1 is a vertical cross-section of part of a multi-needle bank warp-knitting machine provided with two rows of needles and eight guide bars.

The tubular fabric A consists of two vertical flat strips $A_1$ and $A_2$ joined along their vertical edges by interknitting of the sides. The vertical flat strip $A_1$ is knitted on the front needle-bed AV of the knitting machine, and $A_2$ on the rear needle-bed AR. The right hand interknitted junction is referred to B, and C designates the left hand interknitted junction (FIGS. 1 and 2). A plurality of tubular fabrics A may be knitted side by side on the same knitting machine but only one of them will be described in the following description.

FIGS. 1 and 18 illustrate the disposition of the eight guide bars of the knitting machine. Guide bars I and III will knit flat strip $A_1$ on the front needle-bed AV, and guide-bars VI and VIII will knit flat strip $A_2$ on the rear needle-bed AR. Each junction B or C is made of three yarns knitted alternately on both needle-beds AV and AR. It will be explained in detail hereunder (FIGS. 20 to 27) how these six junction yarns are operated by only four guide-bars, namely guide-bars II, V and VII for vertical junction B and guide-bars II, IV and VIII for vertical junction C.

As a result thereof, the knitting pattern can be modified independently on each flat strip $A_1$ or $A_2$ in order to obtain a tubular fabric A of the kind illustrated in FIG. 2, wherein flat strip $A_1$ comprises a top reinforced section $D_1$, a first base fabric section $E_1$, a second reinforced section $F_1$, and a second base fabric section $G_1$, while flat strip $A_2$ comprises a top reinforced section $D_2$, a first base fabric section $E_2$, a second reinforced section $F_2$, and a second base fabric secton $G_2$.

Both top reinforced sections $D_1$ and $D_2$ are located at the same level in order to form a reinforced garter attaching section extending on the whole periphery of the tubular fabric A. On the contrary, both reinforced sections $F_1$ and $F_2$ are displaced with respect to each other: $F_1$ is located lower than $F_2$ (FIGS. 2, 28 and 29) in order to form the toe portion of the resulting stocking, while $F_2$ defines the heel portion.

Figure 3:
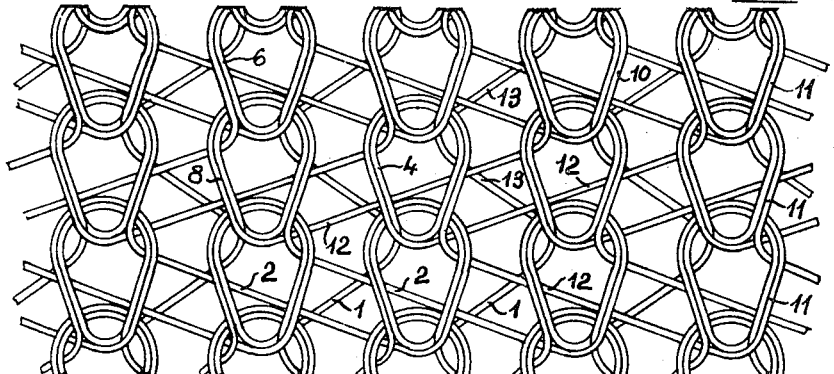
FIG. 3 illustrates on a greatly enlarged scale the loop formation of the base fabric as knitted on the machine (area a', FIG. 2).

FIG. 3 indicates the base fabric structure on the area $a'$ (FIG. 2). FIG. 4 illustrates the loop structure on the area X. FIG. 5 shows the reinforced fabric structure on the area R'. FIG. 6 indicates the fabric structure on the area $a''$, corresponding to a portion of vertical junction B between two base fabric sections $E_1$ and $E_2$ of flat strips $A_1$ and $A_2$.

Referring more particularly to the fabric construction shown in FIGS. 3, 7, 8 and 9, it appears that in the manufacture of the fabric, two sets of warp yarns 1 and 2 are employed. Yarns 1 are threaded on guide-bar III for the front flat strip $A_1$, or on guide-bar VI for the rear flat strip $A_2$. Yarns 2 are threaded on guide-bar I for the front flat strip $A_1$, or on guide bar VIII for the rear flat strip $A_2$. As shown in FIG. 8, each yarn 1 is moved to the right over one needle, under one needle, so that the yarn is wrapped around the needle as shown at 3 in FIG. 7, forming a reversing closed loop as shown at 4 (FIG. 3). Then the yarn 1 is moved to the left over one needle, under one needle, so that it is wrapped about the needle as shown at 5 (FIG. 7) forming a reversing closed loop as shown at 6 (FIG. 3). This constitutes one repeat, which is duplicated throughout the length of the fabric sections $E_1$, $E_2$, $G_1$ and $G_2$.

Each yarn 2 is moved to the left over two needles, under one needle, so that the yarn is wrapped around the needle as shown at 7 in FIG. 9, forming a closed loop as shown at 8 (FIG. 3). Then the yarn is moved to the right over two needles, under one needle so that it is wrapped around the needle as shown at 9 in FIG. 9, forming a closed loop as shown at 10 (FIG. 3).

The relative movements of the yarns 1 and 2 cause the interknitting of same in the manner illustrated in FIG. 3 wherein each yarn 1 is interlocked with a yarn 2. It is apparent that in the base fabric of sections $E_1$, $G_1$, $E_2$ and $G_2$, the sets of warp yarns 1 and 2 are both arranged in three superposed layers (FIG. 3), namely:

An external layer comprising the loops 11 made each of them of one yarn 1 and one yarn 2 interlocked together;

An intermediate layer comprising the long connecting laps 12 located between two successive loops of each yarn 2;

An internal layer comprising only the very short connecting laps 13 located between two successive loops of each yarn 1.

This arrangement permits having the long connecting laps 12 protected on both sides which makes impossible in practice to "catch" one of the corresponding yarns. Moreover, connecting laps 13 are all very obliquely placed and inclined about 45 degrees with respect to the stocking transverse direction. Since they are also very short, they have a tendency to slide against any asperity, which results in a non-catch stocking.

FIGS. 4, 10, 11 and 12 illustrate the loop formation in a reinforced section, and the transition from a base fabric section (below) to a reinforced section (above axis $op$). The reinforced section is made of the same two sets of yarns 1 and 2, the patterns of yarns 2 only having been modified. In the drawings, each yarn of this type has been referred to 2 in a base fabric section, and 22 in a reinforced section (FIG. 11). As shown in FIGS. 4 and 11, each yarn 22 is moved to the right over two needles so that it forms successively an opened loop as shown at 14 and a closed loop as shown at 15. Then the yarn is moved to the left over two needles, so that it forms successively an opened loop 16 and a closed loop 17, and so on.

It appears in FIGS. 4, 10, 11 and 12 that the transition from a base fabric section to a reinforced section is obtained by modifying only the movement of guide-bar I for the front flat strip $A_1$, or of guide-bar VIII for the rear flat strip $A_2$. The relative movements of the yarns 22 and 1 cause the interknitting of same in the manner illustrated in FIG. 5 or in FIGS. 4 and 10, above axis $op$. It appears that each loop formation in a reinforced section consists of three interlocked loops, namely (FIG. 5):

A closed loop 18 formed by a yarn 1;

A closed loop 19 formed by a yarn 22$a$; and

An opened loop 20 formed by another yarn 22$b$.

Like the base fabric, a reinforced fabric section is made of two sets of yarns 1 and 22, arranged in three superposed layers (FIG. 5), namely:

An external layer comprising the loops 18, 19 and 20;

An intermediate layer comprising the transverse connecting laps 23 and the oblique connecting laps 24 located alternately between the successive loops of each yarn 22;

An internal layer comprising only the short and oblique connecting laps 13 of yarns 1.

FIGS. 6 and 17 illustrate the loop formation in the right hand vertical junction B, between two base fabric sections $E_1$ and $E_2$ (FIG. 2, area $a''$). The junction B is formed by one yarn 1 (referred to $1_B$) and two yarns 2 (referred to $2_B$ and $2_{B'}$). The yarn $1_B$ is threaded on guide-bar V which has only one guide 25 in that zone. Yarn $2_B$ is threaded on guide-bar VII also provided with one guide 26 only. Yarn $2_{B'}$ is threaded in the single guide 27 of guide-bar II in that zone. Guide-bars II, V and VII are moved in order to knit yarns $1_B$, $2_B$ and $2_{B'}$ alternately on each needle-bed AV or AR in the same pattern as the base fabric sections $E_1$, $E_2$, $G_1$ or $G_2$. Guide-bars II and VII have movements symmetrical with respect the center K of the diametrical plane $xy$, $x'y'$ of the tubular fabric A, said plane $xy$, $x'y'$ being located longitudinally between needle-beds AV and AR on the knitting-machine (FIGS. 12, 18 and 19).

As a result thereof, the vertical junction C, also made of three yarns namely: one yarn 1 referred to $1_C$, and two yarns 2 referred to $2_C$ and $2_{C'}$, may be knitted by threading yarn $1_C$ in the single guide 28 of guide-bar IV in that zone, yarn $2_C$ in the guide 29 of guide bar II, and yarn $2_{C'}$ in the guide 30 of guide bar VII (FIG. 18). This arrangement will be explained in detail with reference to FIGS. 18 to 27, and it permits to knit the six junction yarns $1_B$, $2_B$, $2_{B'}$, $1_C$, $2_C$, and $2_{C'}$ with only four guide bars II, IV, V and VII.

In FIG. 18, the guide-bars having displacements symmetrical with respect to the center K have been connected by symbolical dotted lines 31.

In the present example, guide-bar I has 157 guides knitting on 159 needles of the front needle-bar AV. Guide-bar II has only two guides 27 (threaded with yarn $2_B$) and 29 (threaded with yarn $2_C$), each of them knitting alternately on one needle of the front needle-bar AV, and on one needle of the rear needle-bar AR. Guide-bar III has 158 guides knitting on the 159 needles of the front needle-bar AV. Guide-bar IV has only one guide 28 knitting the yarn $1c$ of the left hand vertical junction C alternately on one needle of the front needle-bar AV and on one needle of the rear needle-bar AR. Guide bar V has only one guide 25 knitting the yarn $1_B$ of right hand vertical junction B alternately on one needle of the front needle-bar AV and on one needle of the rear needle-bar AR. Guide-bar VI has 158 guides knitting on the 159 needles of the rear needle-bar AR. Guide-bar VII has only two guides 26 (threaded with yarn $2_B$) and 30 (threaded with yarn $2_{C'}$), each of them knitting alternately on one needle of the front needle-bar AV and on one needle of the rear needle-bar AR. Guide-bar VIII has 157 guides knitting on the 159 needles of the rear needle-bar AR.

Quite obviously, if it is desired to knit at the same time a number of tubular fabrics A on the same knitting machine, it is only necessary to repeat the above-mentioned disposition all along each guide-bar I to VIII and each needle-bar AV and AR. In the present example (FIG. 18), the knitting machine may be mounted as follows:

Front needle bar AV: five needles suppressed; 159 needles; five needles suppressed; 159 needles; five needles suppressed; 159 needles; and so on.

Rear needle bar AR: idem.

Guide-bars I and VIII: six guides suppressed; 157 guides threaded with yarns 2 or 22; six guides suppressed; 157 guides threaded; and so on.

Guide-bars III and VI: five guides suppressed; 158 guides threaded with yarns 1; five guides suppressed; 158 guides threaded; and so on.

Guide-bar II: four guides suppressed; one guide 27 threaded with a yarn $2_{B'}$; 158 guides suppressed; one guide 29 threaded with a yarn $2_C$; four guides suppressed; one guide 27 threaded with a yarn $2_{B'}$; 158 guides suppressed; and so on.

Guide-bar VII: four guides suppressed; one guide 26 threaded with a yarn $2_B$; 158 guides suppressed; one guide 30 threaded with a yarn $2_{C'}$; four guides suppressed; one guide 26 threaded with a yarn $2_B$; 158 guides suppressed; and so on.

Guide-bar IV: 163 guides suppressed; one guide 28 threaded with a yarn $1_C$; 163 guides suppressed; and guide 28 threaded with a yarn $1_C$; 163 guides suppressed; and so on.

Guide-bar V: five guides suppressed; one guide 26 threaded with a yarn $1_B$; 163 guides suppressed; one guide 25 threaded with a yarn $1_B$; 163 guides suppressed; one guide 25 threaded with a yarn $1_B$; 163 guides suppressed; and so on.

The displacements of guide bars I and VIII may be modified according as the knitting pattern corresponds to a simple fabric section $E_1$, $G_1$, $E_2$, or $G_2$, or to a reinforced section $D_1$, $D_2$, $F_1$, or $F_2$. However, the movement of guide-bars II, III, IV, V, VI and VII remains constant all along the tubular fabric A. As a result thereof, the side connection between the edges of two reinforced sections $D_1$ and $D_2$ located front to front is obtained by means of the above mentioned base fabric vertical junctions B and C, as shown in FIGS. 13, 14, 15 and 16.

The movements of guide-bars II and VII have been illustrated in detail in FIGS. 20 to 27.

FIGS. 20 and 21 show guide bars II and VII at the same time. Junction yarns $2_C$ and $2_{C'}$ are knitted at the same time on the two adjacent first needles referred to 32 for each yarn $2_C$ and 33 for each yarn $2_{C'}$, both needles 32 and 33 being on the rear needle-bar AR. During this displacement, the yarns $2_B$, and $3_B$ of the right hand vertical junction B are not knitted, since their guides 26 and 27 are moved in a blank space out of reach of the corresponding two last needles 34 and 35 on the rear needle-bar AR.

Then, at the following stroke of the knitting-machine (FIGS. 22 and 23), the rear needle-bar AR is lowered and the front needle-bar AV is raised. Junction yarns $2_B$ and $2_{B'}$, are knitted at the same time on the two adjacent last needles, referred to 36 for each yarn $2_B$ and 37 for each yarn $2_{B'}$, both needles 36 and 37 being on the front needle-bar AV. During this displacement, the yarns $2_C$ and $2_{C'}$ of the left hand vertical junction C are not knitted, since their guides 29 and 30 are moved in a blank space out of reach of the corresponding two first needles 38 an 39 on the front needle-bar AV.

Then, at the following stroke of the knitting-machine (FIGS. 24 and 25), the front needle-bar AV is lowered and the rear needle-bar AR is raised. Junction yarns $2_B$ and $2_{B'}$ are knitted at the same time on the last needles 34 and 35. During this displacement, the yarns $2_C$ and $2_{C'}$ are not knitted, since their guides 29 and 30 are moved in a blank space out of reach of the first needles 32 and 33 on rear needle-bar AR.

At the following stroke of the knitting-machine (FIGS. 26 and 27), the rear needle-bar AR is lowered and the front needle bar AV is raised. Junction yarns $2_C$ and $2_{C'}$ are knitted at the same time on the first needles 38 and 39. During this displacement, the yarns $2_B$ and $2_{B'}$ are not knitted, since their guides 26 and 27 are moved in a blank space, out of reach of the last needles 36 and 37 on the front needle-bar AV.

These four successive strokes of the knitting machine constitute one repeat, which is duplicated throughout the length of the fabric to knit the vertical junctions B and C.

A tubular fabric A object of the invention may be knitted on any type of warp knitting machine having two parallel needle-beds, regardless of the type of the needles, which may be bearded needles, latch needles, self-acting needles, tube needles or the like. In a preferred embodiment of the invention, the tubular fabric A is knitted on a Rachel knitting machine having self-acting needles.

The tubular fabric A (FIG. 2) is taken out of the knitting machine and laid out flat as shown in FIG. 28 with superposition of the axes $xy$, $x'y'$ corresponding to the vertical junctions B and C. The loop formation of both junctions B and C being identical to the structure of the base fabric sections $E_1$, $E_2$, $G_1$ and $G_2$ (FIG. 6), there is no visual difference along the vertical edges of the latter and both junctions B and C disappear all along the stocking leg portion (FIGS. 28 and 29). Then the tubular fabric A is cut and sewed up under the foot section, in an underfoot seam 40, along a curved line L, L', L", L''' (FIG. 28). It is apparent that the resulting clippings mainly consist of base fabric section $G_2$, i.e. said clippings are much less in weight than if the section $G_2$ were a reinforced fabric section, as it would happen in the known art. The garter attaching section of the stocking may be still reinforced by doubling up a certain length of the peripheral reinforced section $D_1$, $D_2$, and by overstitching or sewing this double thickness. Said garter attaching section may be also provided by adding, overstitching or sewing another fabric or cloth strip specially designed for this purpose. After heat setting, the seamless stocking will appear as shown in FIG. 29.

Minor changes may be made without leaving the scope of the invention as claimed. For example, if it is desired to render junctions B and C invisible also between both reinforced sections $D_1$ and $D_2$, it is sufficient to modify also the pattern of guide bars II and VII in that zone, in order to knit a reinforced fabric alternately on both needle-bars AV and AR. This operation would be obvious for one skilled in the art and, in that case, only guide-bars III, IV, V and VI would have always the same movement all along the tubular fabric A.

I claim:

1. A warp-knit, seamless stocking having foot and leg portions including a base fabric section and selected reinforced fabric sections comprised of successive courses having two groups of spaced apart wales, said groups being knit from sets of warp yarns to define front and rear portions of said stocking, and two groups of connecting wales disposed between said front and rear portions of said stocking, each group of connecting wales being knit from said sets of warp yarns and additional connecting warp yarns joining the front and rear portions to form a tube, and said base fabric section and said reinforced fabric section being knit throughout of the same warp yarns.

2. A warp-knit, seamless stocking as set forth in claim 1 characterized by being non-run and wherein each of said groups is knit from two sets of warp yarns, with each yarn in one of said sets of warp yarns lapping to adjacent wales in opposite directions and forming stitch loops alternately in said adjacent wales and in successive courses throughout the fabric, and each yarn in the other of said sets of warp yarns lapping across one wale in opposite directions and forming stitch loops alternately in wales at opposite sides of said one wale and in successive courses in said base fabric section of said stocking.

3. A warp-knit, seamless stocking as set forth in claim 2 wherein each yarn in said other of said sets of warp yarns laps to at least two adjacent wales in opposite directions and forms at least two adjacent stitch loops in the same course in said reinforced fabric section.

4. A warp-knit, seamless stocking as set forth in claim 1 wherein said reinforced fabric sections are knitted in uppermost courses of said front and rear portions to define an upper welt portion of the stocking, additional reinforced fabric sections are knitted in a predetermined number of courses in said front and rear portions of said stocking adjacent the lower end thereof with said additional reinforced courses of said front portion being offset below said additional reinforced courses in said rear portion, said foot of said stocking including a heel and a toe, said heel being formed in said additional reinforced courses of said rear portion, and said toe being formed in said additional reinforced courses in said front portion.

5. A warp-knit, seamless stocking as set forth in claim 2 wherein said two sets of warp yarns forming said front and rear portions of said stocking are knitted to define three superposed layers; namely, an external layer comprised of stitch loops made of each of two interknit yarns of different sets, an intermediate layer comprising long connecting laps between two successive loops of each yarn of one set, and an internal layer comprising only short connecting laps between successive loops of each yarn of the other set.

6. A warp-knit, seamless stocking as set forth in claim 1 wherein each of said groups is knit from two sets of warp yarns with each yarn of one of said sets of warp yarns forming a basic stitch loop pattern throughout the entire fabric and each yarn in the other of said sets of warp yarns forming a basic stitch loop pattern in said base fabric section and forming a different stitch loop pattern in said reinforced fabric section.

7. A warp-knit, seamless stocking as set forth in claim 5 wherein said external layer in said reinforced fabric section is comprised of three stitch loops, and said external layer in said base fabric section is comprised of two stitch loops.

References Cited

UNITED STATES PATENTS

| | | |
|---|---|---|
| 1,078,914 | 11/1913 | Gabel. |
| 1,855,033 | 4/1932 | Spiers. |
| 1,869,304 | 7/1932 | Decker. |
| 2,312,334 | 3/1942 | Guyler. |

RONALD FELDBAUM, *Primary Examiner.*

U.S. Cl. X.R.

66—178, 182, 186, 187